United States Patent
Chen

(10) Patent No.: US 8,044,943 B2
(45) Date of Patent: Oct. 25, 2011

(54) TOUCH PANEL

(75) Inventor: Ying-Lieh Chen, Tainan County (TW)

(73) Assignee: Himax Technologies Limited, Sinshih Township, Tainan County (TW)

( * ) Notice: Subject to any disclaimer, the term of this patent is extended or adjusted under 35 U.S.C. 154(b) by 813 days.

(21) Appl. No.: 12/132,244

(22) Filed: Jun. 3, 2008

(65) Prior Publication Data
US 2009/0295754 A1 Dec. 3, 2009

(51) Int. Cl.
*G06F 3/042* (2006.01)
(52) U.S. Cl. ........ 345/175; 345/173; 345/179; 345/182; 345/183; 178/18.09; 178/19.05; 463/37
(58) Field of Classification Search .......... 345/173, 345/175, 179, 182, 183, 207; 178/18.09, 178/19.05; 463/37
See application file for complete search history.

(56) References Cited

U.S. PATENT DOCUMENTS

| | | | | |
|---|---|---|---|---|
| 5,386,543 A * | 1/1995 | Bird | ............................... | 358/1.1 |
| 2003/0179323 A1 * | 9/2003 | Abileah et al. | .................. | 349/24 |
| 2006/0261254 A1 * | 11/2006 | Suzuki et al. | .............. | 250/214 R |
| 2007/0109239 A1 * | 5/2007 | den Boer et al. | ................. | 345/87 |
| 2007/0176905 A1 * | 8/2007 | Shih et al. | ...................... | 345/173 |
| 2008/0055262 A1 * | 3/2008 | Wu et al. | ......................... | 345/173 |
| 2008/0122792 A1 * | 5/2008 | Izadi et al. | ...................... | 345/173 |
| 2008/0303705 A1 * | 12/2008 | Sakakibara | ................... | 341/172 |
| 2009/0101900 A1 * | 4/2009 | Chuang et al. | .................. | 257/59 |

* cited by examiner

*Primary Examiner* — Lun-Yi Lao
*Assistant Examiner* — Gregory J Tryder
(74) *Attorney, Agent, or Firm* — Thomas|Kayden

(57) ABSTRACT

Touch panels comprising a bias line biased at a bias voltage, a select line, a readout line, a photo cell and a readout circuit. The photo cell comprises a first photo switch, a second photo switch and a storage capacitor. The first photo switch and the storage capacitor is coupled in series between the readout line and the bias line, and the first photo switch is further controlled by the select line. The second photo switch is connected between the readout line and the bias line. The readout circuit and the select line are managed by a reset mode, an exposure mode and a readout mode. The voltage variation of output terminal of the readout circuit is used in obtaining the state of the photo cell.

9 Claims, 4 Drawing Sheets

TOUCH PANEL

BACKGROUND OF THE INVENTION

1. Field of the Invention

The present invention relates to touch panels.

2. Description of the Related Art

There are a number of types of touch panel technologies, which include resistive touch panels and capacitive touch panels. However, resistive and capacitive touch panels are made by covering a sensor film on the display panel, and therefore the process is complicated and the costs are expensive. In addition, multi-touch sensing is not easily accomplished by the conventional resistive or capacitive touch panels. Thus, to decrease costs and provide multi-touch sensing, novel touch panel technologies are called for.

BRIEF SUMMARY OF THE INVENTION

The invention provides touch panels comprising a bias line biased at a bias voltage, a select line, a readout line, a photo cell and a readout circuit. The photo cell comprises a first photo TFT, a second photo TFT and a storage capacitor. The first terminal and control terminal of the first photo TFT are coupled to the readout line and the select line, respectively. The first terminal of the second photo TFT is coupled to the first terminal of the first photo TFT, and the second terminal and the control terminal of the second photo TFT are coupled to the bias line. The storage capacitor is coupled between the second terminal of the first photo TFT and the bias line. The readout circuit comprises an operational amplifier, a feedback capacitor, a first switch and a multiplexer. The inverting input terminal of the operational amplifier is coupled to the readout line. The feedback capacitor is coupled between the inverting input terminal and the output terminal of the operational amplifier. The switch is coupled between the inverting input terminal and the output terminal of the operational amplifier. The multiplexer selectively outputs a reference voltage or a bias voltage to the non-inverting input terminal of the operational amplifier.

The above mentioned touch panel is managed by at least three modes. In a reset mode, the select line asserted to enable the first photo TFT, the first switch is turned on, and the multiplexer outputs the reference voltage to the non-inverting input terminal of the operational amplifier. In an exposure mode, the select line is unasserted and stops enabling the first photo TFT, the first switch is turned off, and the multiplexer outputs the bias voltage to the non-inverting input terminal of the operational amplifier. In a readout mode, the select line is asserted to enable the first photo TFT, the first switch is kept off, and the multiplexer outputs the reference voltage to the non-inverting input terminal of the operational amplifier. To determine whether the touch panel is touched at the photo cell, the voltage variation of the output terminal of the operational amplifier is measured at the end of the readout mode.

In some other embodiments, the touch panel comprises a bias line, a select line, a readout line and a photo cell. The photo cell comprises a storage capacitor a first photo switch and a second photo switch. The first photo switch is connected between the storage capacitor and the readout line, and is further controlled by the select line. The second photo switch is connected between the readout line and the bias line, and is further controlled by the bias line.

The above and other advantages will become more apparent with reference to the following description taken in conjunction with the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description shows some embodiments carrying out the invention. This description is made for the purpose of illustrating the general principles of the invention and should not be taken in a limiting sense. The scope of the invention is best determined by reference to the appended claims.

Figure 1:
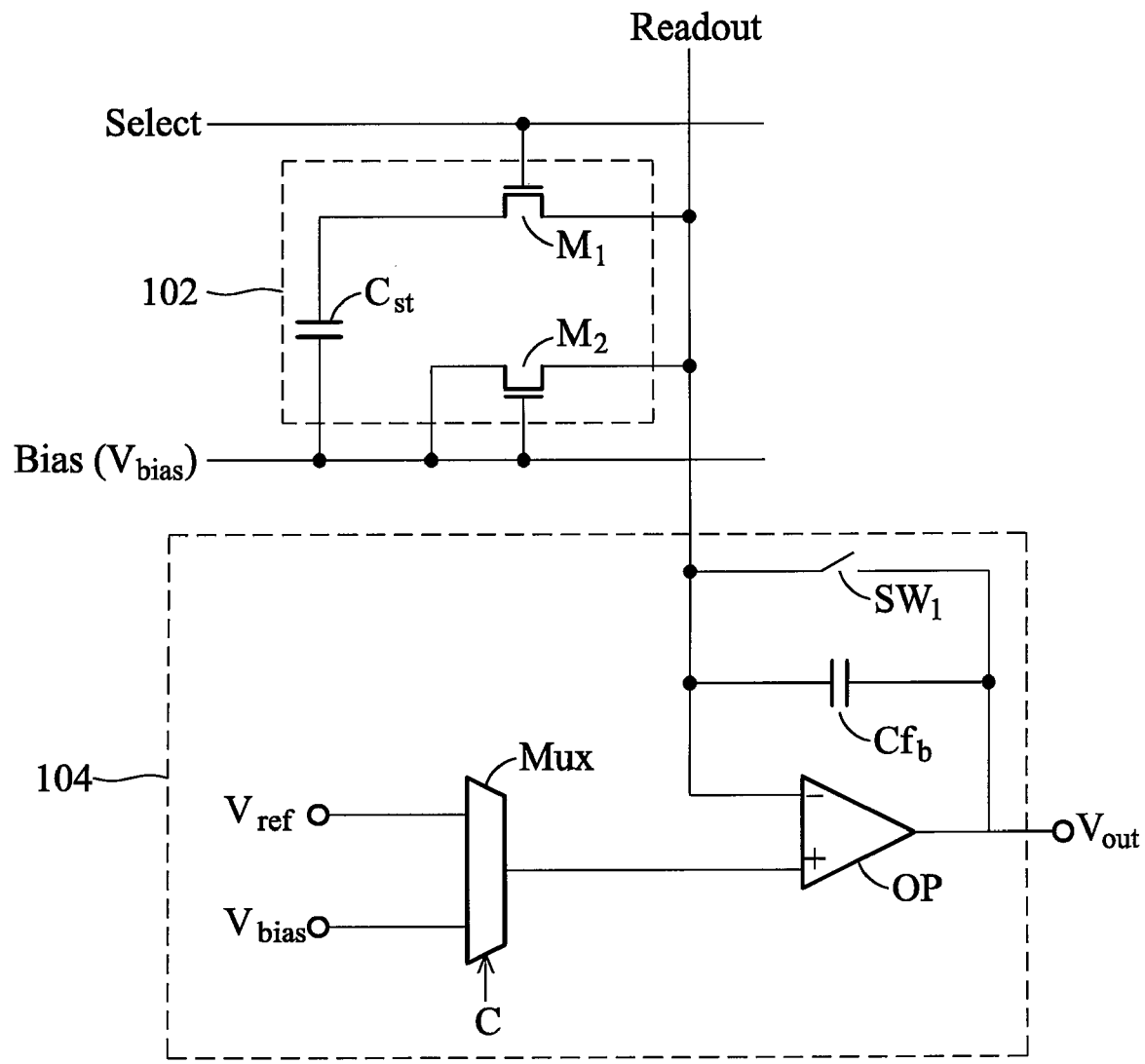
FIG. 1 illustrates an embodiment of the invention.

FIG. 1 illustrates a touch panel according to a first embodiment of the invention, which comprises a bias line (Bias) biased at a bias voltage $V_{bias}$, a select line (Select), a readout line (Readout), a photo cell 102 and a readout circuit 104. The readout circuit 104 comprises an operational amplifier (OP), a feedback capacitor $C_{fb}$, a first switch $SW_1$ and a multiplexer Mux. The operational amplifier (OP) has an inverting input terminal, a non-inverting input terminal and an output terminal. Referring to FIG. 1, the inverting input terminal of the operational amplifier (OP) is coupled to the readout line (Readout). The feedback capacitor $C_{fb}$ is coupled between the inverting input terminal and the output terminal of the operational amplifier (OP). Additionally, the first switch $SW_1$ is coupled between the inverting input terminal and the output terminal of the operational amplifier (OP). The multiplexer Mux is controlled by a control signal C to selectively output a reference voltage $V_{ref}$ or the bias voltage $V_{bias}$ to the non-inverting input terminal of the operational amplifier (OP).

The photo cell 102 comprises a first photo TFT $M_1$, a second photo TFT $M_2$, and a storage capacitor $C_{st}$. The first photo TFT $M_1$ has a first terminal, a second terminal and a control terminal, wherein the first terminal is coupled to the readout line (Readout) and the control terminal is coupled to the select line (Select). The second photo TFT $M_2$ has a first terminal, a second terminal and a control terminal, wherein the first terminal is coupled to the readout line (Readout), and the second terminal and the control terminal are coupled to the bias line (Bias). The storage capacitor $C_{st}$ is coupled between the second terminal of the first photo TFT $M_1$ and the bias line (Bias).

The touch panel shown in FIG. 1 is operated in three modes. In a reset mode, the select line (Select) is asserted to enable the first photo TFT $M_1$, and the multiplexer Mux outputs the reference voltage $V_{ref}$ to the non-inverting input terminal of the operational amplifier (OP). Because of the virtual short of the inverting and non-inverting input terminals of the operational amplifier (OP), the inverting input terminal of the operational amplifier (OP) is fixed to the reference voltage $V_{ref}$ and thus the storage capacitor $C_{st}$ receives the reference voltage $V_{ref}$, such that the voltage difference of the storage capacitor $C_{st}$ is ($V_{ref}-V_{bias}$). Further, in the reset mode, the first switch $SW_1$ is turned on to reset the feedback capacitor $C_{fb}$, and, the output terminal of the operational amplifier (OP) is fixed to the reference voltage $V_{ref}$.

After the reset mode, the touch panel enters an exposure mode. The select line (Select) is unasserted to turn off the first photo TFT $M_1$, and the multiplexer Mux outputs the bias voltage $V_{bias}$ to the non-inverting input terminal of the operational amplifier $(OP)_s$. At this moment, the condition of the first photo TFT $M_1$ is dependent on whether there is light emitted onto it. When the touch panel is not touched at the photo cell 102, light beams into the first and second photo TFTs $M_1$ and $M_2$ and enables them. Thus, the first and second photo TFTs $M_1$ and $M_2$ form a discharge path for the storage capacitor $C_{st}$, and the voltage difference stored in the storage capacitor $C_{st}$ decreases toward the bias voltage $V_{bias}$. When the touch panel is touched at the photo cell 102, light is blocked from the first and second photo TFTs $M_1$ and $M_2$ and the first and second photo TFTs $M_1$ and $M_2$ are disabled. Thus, the voltage difference stored in the storage capacitor $C_{st}$ is kept at $V_{ref}-V_{bias}$. Further, in the exposure mode, the first switch $SW_1$ can be turned off to maintain the output terminal of the operational amplifier (OP) at the reference voltage $V_{ref}$.

After the exposure mode, the touch panel enters a readout mode. In the readout mode, the select line (Select) is asserted to enable the first photo TFT $M_1$, the first switch $SW_1$ is turned off, and the multiplexer Mux outputs the reference voltage $V_{ref}$ to the non-inverting input terminal of the operational amplifier (OP). Because of the virtual short of the inverting and non-inverting input terminals of the operational amplifier (OP), the inverting input terminal of the operational amplifier (OP) should follow the voltage level of the non-inverting input terminal ($V_{ref}$). When the photo cell 102 is not touched in the exposure mode, the voltage difference of the storage capacitor $C_{st}$ drops toward the bias voltage $V_{bias}$, and thus there are charges flow from the feedback capacitor $C_{fb}$ to the storage capacitor $C_{st}$ to cause the voltage level $V_{out}$ of the output terminal of the operational amplifier (OP) drops away from the reference voltage $V_{ref}$. In another case that the photo cell 102 is touched in the exposure mode, the voltage level of the inverting input terminal of the operational amplifier (OP) is at the reference voltage $V_{ref}$ since the storage capacitor $C_{st}$ has not been discharged in the exposure mode. Thus, the voltage level $V_{out}$ of the operational amplifier is kept at the reference voltage $V_{ref}$. In conclusion, it is determined whether the photo cell 102 is touched by monitoring the variation of $V_{out}$. When the photo cell 102 is touched, $V_{out}$ is kept at the reference voltage $V_{ref}$. When the photo cell 102 is not touched, $V_{out}$ drops off the reference voltage $V_{ref}$.

Figure 2A:
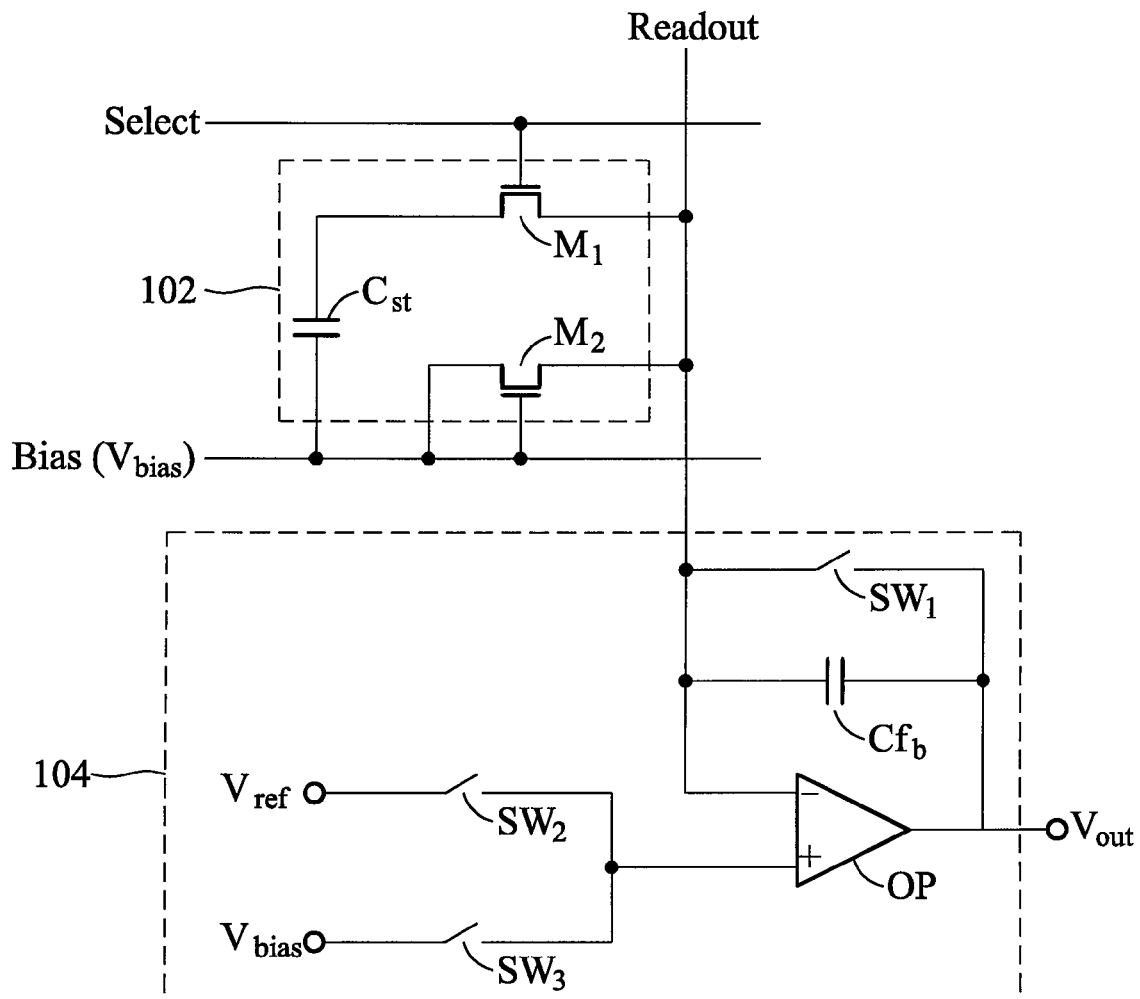
FIG. 2A illustrates another embodiment of the touch panel of the invention.
Figure 2B:
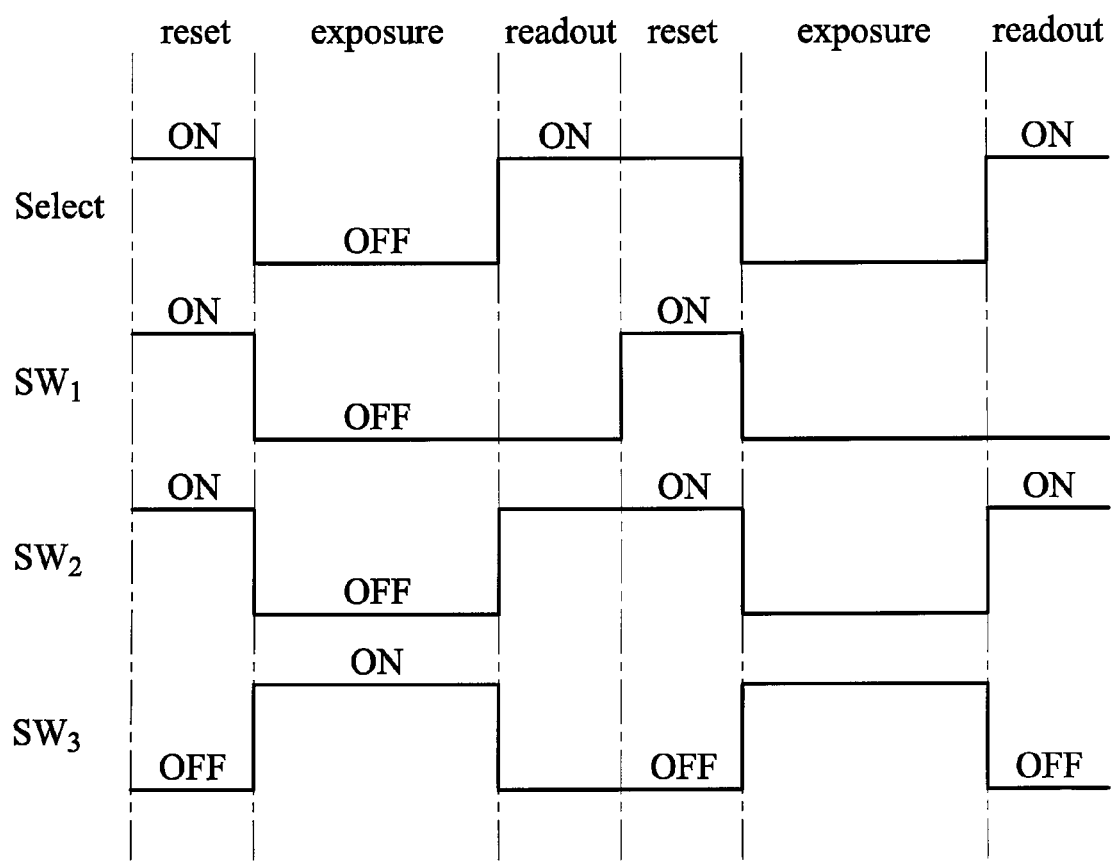
FIG. 2B shows the actions of Select, $SW_1$, $SW_2$ and $SW_3$ by waveforms.

FIG. 2A shows a touch panel according to a second embodiment of the invention, in which the multiplexer of FIG. 1 is implemented by switches $SW_2$ and $SW_3$. FIG. 2B shows the timing diagram of the operation of the touch panel. In the reset mode, the select line (Select) are asserted, the switch $SW_1$ and the switch $SW_2$ are turned on, and the switch $SW_3$ is turned off. In the exposure mode, the select line (Select) is unasserted, the switch $SW_1$ and the switch $SW_2$ are turned off, and the switch $SW_3$ is turned on. In the readout mode, the select line (Select) is asserted, the switch $SW_1$ is turned off, the switch $SW_2$ is turned on, and the switch $SW_3$ is turned off.

In some embodiments, the first and second photo TFTs $M_1$ and $M_2$ may be replaced by other components, such as photo switches, that are turned on when receiving light. The photo switches may be further controlled by the voltages acts on their control terminals.

In some embodiments, any circuit that can detect the voltage variation of the storage capacitor $C_{st}$ may replace the readout circuit 104. The circuit is reset in the reset mode, and accumulates charges from the storage capacitor $C_{st}$ to determine whether the photo cell 102 is touched.

Photo cells (102) may be interlaced into a conventional display panel with appropriately arranged select lines (Select), bias lines (Bias), readout lines (Readout), and corresponding readout circuit (comprising the operational amplifiers (OP), first switches ($SW_1$) and feedback capacitors ($C_{fb}$), to construct a touch panel). By properly driving the select lines (Select) and the first switches ($SW_1$) and properly biasing the non-inverting input terminals of the operational amplifiers (OP), the touch panel can detect the state of every photo cell (102); thus, providing multi-touch sensing.

Figure 3:
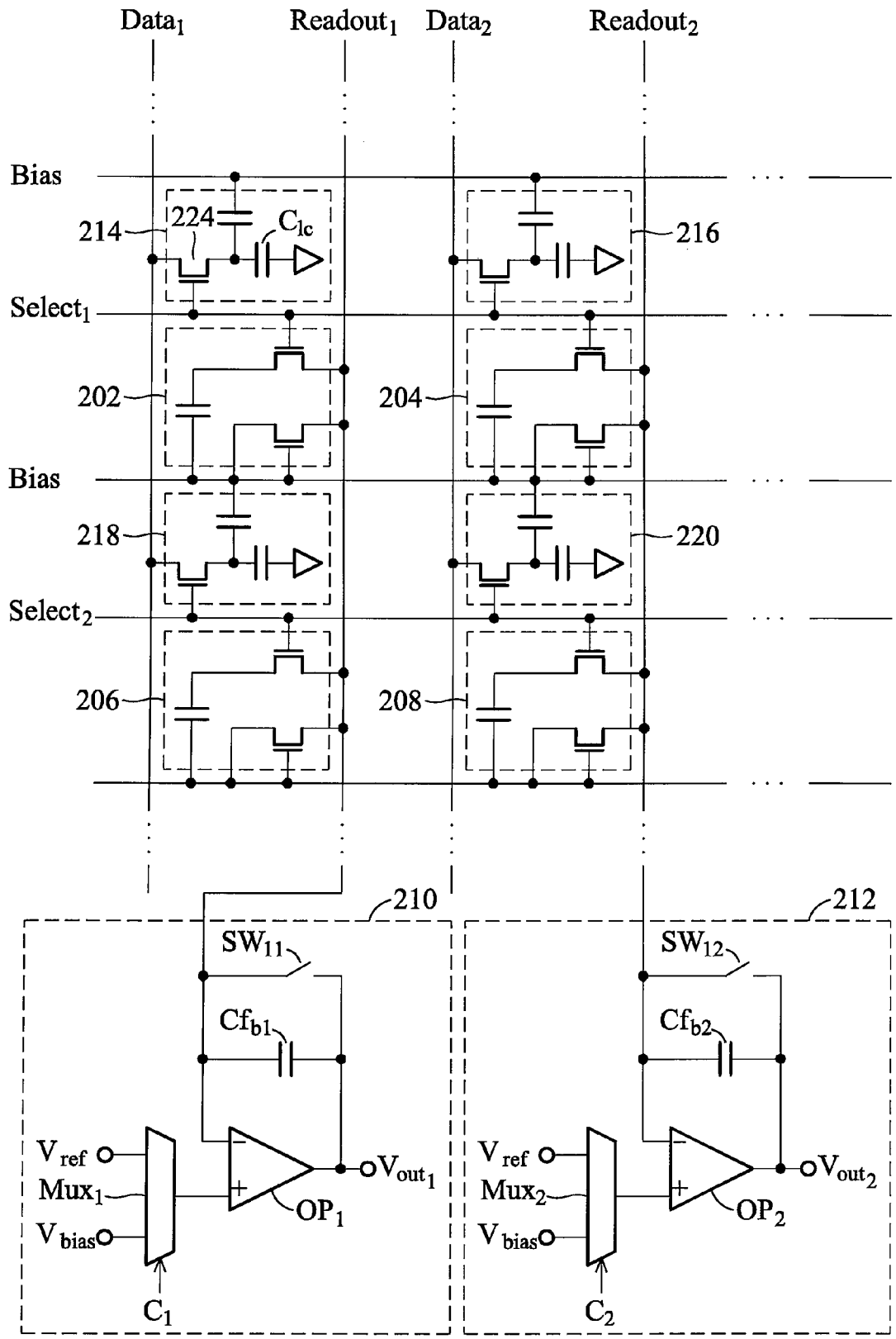
FIG. 3 illustrates an embodiment of the touch panel of the invention.

FIG. 3 illustrates a touch panel according to a third embodiment of the invention. Photo cells of the invention (202~208) are distributed over the touch panel. Photo cells 202 and 204 belong to the same row and share a select line ($Select_1$). Photo cells 206 and 208 belong to the same row and share a select line ($Select_2$). Photo cells 202 and 206 belong to the same column and share a readout line ($Readout_1$) and a readout circuit 210 (comprising an operational amplifier $OP_1$, a feedback capacitor $C_{fb1}$ and a multiplexer $Mux_1$). Photo cells 204 and 208 belong to the same column and share a readout line ($Readout_2$) and a readout circuit 212 (comprising an operational amplifier $OP_2$, a feedback capacitor $C_{fb2}$ and multiplexer $Mux_2$). The select lines ($Select_1$, $Select_2$ ...) sequentially enable the rows of photo cells and the state of the enabled photo cells can be monitored via $V_{out1}$~$V_{out2}$. In this embodiment, image pixels 214, 216, 218 and 220 relate to photo cells 202, 204, 206 and 208, respectively, and they share select lines ($Select_1$ or $Select_2$). Each image pixel comprises a liquid crystal cell $C_{1c}$ and a data switch 224, and relates to one data line ($Data_1$ or $Data_2$). For example, in the image pixel 214, the data switch 224 is turned on by the signal on the select line $Select_1$, and so that the data on the data line $Data_1$ is passed into the liquid crystal cell $C_{1c}$ via the data switch 224. The data switch 224 and the photo TFT $M_1$ and $M_2$ can be made by the same TFT manufacturing process.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded to the broadest interpretation so as to encompass all such modifications and similar arrangements.

What is claimed is:
1. A touch panel, comprising:
   a bias line, biased at a bias voltage;
   a select line;
   a readout line;
   a photo cell, comprising:
      a first photo TFT, having a first terminal, a second terminal and a control terminal, wherein the first terminal is coupled to the readout line and the control terminal is coupled to the select line;
      a second photo TFT, having a first terminal, a second terminal and a control terminal, wherein the first terminal is coupled to the readout line, the second terminal and the control terminal are coupled to the bias line; and
      a storage capacitor, coupling the second terminal of the first photo TFT to the bias line;
   a readout circuit comprising:
      an operational amplifier, having an inverting input terminal, a non-inverting input terminal and an output terminal, wherein the inverting input terminal is coupled to the readout line;
      a feedback capacitor, coupled between the inverting input terminal and the output terminal of the operational amplifier; and a first switch, coupled between the inverting input terminal and the output terminal of the operational amplifier, and a multiplexer for selectively outputting a reference voltage or the bias voltage to the non-inverting input terminal.

2. The touch panel of claim 1, wherein, in a reset mode, the select line is asserted, the first switch is turned on, and the multiplexer outputs the reference voltage to the non-inverting input terminal.

3. The touch panel of claim 1, wherein, in an exposure mode, the select line is unasserted, the first switch is turned off, and the multiplexer outputs the bias voltage to the non-inverting input terminal.

4. The touch panel of claim 1, wherein, in a readout mode, the select line is asserted, the first switch is turned off, and the multiplexer outputs the reference voltage to the non-inverting input terminal of the operational amplifier, and a voltage of the output terminal of the operational amplifier is used in determining whether the touch panel is touched at the photo cell.

5. A touch panel, comprising:
a bias line;
a select line;
a readout line; and
a photo cell, comprising:
 a storage capacitor;
 a first photo TFT, having a first terminal, a second terminal and a control terminal, wherein the first terminal is coupled to the readout line, the second terminal is connected to the storage capacitor and the control terminal is coupled to the select line; and
a second photo TFT, having a first terminal, a second terminal and a control terminal, wherein the first terminal is coupled to the readout line, the second terminal and the control terminal are coupled to the bias line.

6. The touch panel of claim 5, wherein in a reset mode, the storage capacitor receives a reference voltage via the first photo switch while the select line is asserted;

wherein in a exposure mode, the select line is unasserted;

wherein in a readout mode, a voltage of the storage capacitor is read out via the first photo switch while the select line is asserted, to determine whether the photo cell is touched.

7. The touch panel of claim 6, further comprising a readout circuit, which is reset in the reset mode, and accumulates charges from the storage capacitor to determine whether the photo cell is touched.

8. The touch panel of claim 7, wherein the readout circuit comprises:

an operational amplifier, having an inverting input terminal, a non-inverting input terminal and an output terminal, wherein the inverting input terminal is coupled to the readout line;

a feedback capacitor, coupled between the inverting input terminal and the output terminal of the operational amplifier; and a first switch, coupled between the inverting input terminal and the output terminal of the operational amplifier, and being turned on in the reset mode; and a multiplexer for outputting a reference voltage to the non-inverting input terminal in the reset mode and the readout mode, and outputting the bias voltage to the non-inverting input terminal in the exposure mode.

9. The touch panel of claim 5, further comprising an image pixel corresponding to a data line and having a liquid crystal cell and a data switch, wherein the data switch is connected between the data line and the liquid crystal cell and is controlled by the select line.

* * * * *